United States Patent [19]

Yoshinaka et al.

[11] Patent Number: 4,747,463
[45] Date of Patent: May 31, 1988

[54] DIAPHRAGM ACTUATOR MOUNTING ON A TRANSFER CASE

[75] Inventors: Toshio Yoshinaka, Nagoya; Shuichiro Ida; Shuji Nagano, both of Toyota; Hiroomi Fukaya, Takahama, all of Japan

[73] Assignee: Toyota Jidosha Kabushiki Kaisha, Toyota, Japan

[21] Appl. No.: 892,379

[22] Filed: Aug. 4, 1986

[30] Foreign Application Priority Data

Aug. 30, 1985 [JP] Japan .................. 60-133595[U]

[51] Int. Cl.$^4$ .............................................. B60K 17/34
[52] U.S. Cl. .................................... 180/247; 180/233
[58] Field of Search .................. 180/247, 233; 74/863; 192/85 V, 3.59; 285/347

[56] References Cited

U.S. PATENT DOCUMENTS 4,381,828  5/1983  Lunn et al. ......................... 180/247
4,545,457 10/1985  Iwata ................................. 180/247

FOREIGN PATENT DOCUMENTS 59-76422  5/1984  Japan .
2163107   2/1986  United Kingdom ................ 180/233

OTHER PUBLICATIONS

Toyota Land Cruiser, Technical Illustration 61501.

Primary Examiner—John J. Love
Assistant Examiner—Donn McGiehan
Attorney, Agent, or Firm—Oblon, Fisher, Spivak, McClelland & Maier

[57] ABSTRACT

A transfer unit in an automobile for selectively transferring the drive power to wheels from a two-wheel-drive state to a four-wheel-drive state, and vice versa, having a vacuum-operated actuator. The actuator is secured to the transfer case by a cylindrical fitting so that a transfer shaft can extend from the transfer case to the actuator body and so that oil in the transfer case will flow to the actuator body.

12 Claims, 3 Drawing Sheets

4,747,463

DIAPHRAGM ACTUATOR MOUNTING ON A TRANSFER CASE

BACKGROUND OF THE INVENTION

1. Field of the Invention

The present invention relates to a mounting arrangement for a diaphragm actuator used in a switching mechanism of a transfer unit in a four wheel drive automobile.

2. Description of Related Art

It is known to provide a transfer unit in a four wheel drive automobile to selectively transfer the drive power to the wheels from a two wheel drive state to a four wheel drive state, and vice versa. To effect the transfer, it is known to provide a vacuum-operated actuator (for example, c.f., Japanese Unexamined Utility Model Publication No. 59-76422). In one type of mounting arrangement, the actuator can be located separately from the transfer case, and an interconnecting means such as a rod extends between the transfer case and the actuator body in an exposed manner. It is necessary, in this arrangement, to provide a seal for both the transfer case and the actuator body and to electroplate the exposed rod or the like to prevent corrosion, resulting in additional cost. Another arrangement is to attach the actuator to the transfer case. An example of such an arrangement is shown in FIG. 3 of the attached drawings, in which a body of an actuator 2 is attached to planar adjoining surfaces 1d and 2d of a transfer case 1. With this type of arrangement, it is necessary to provide the planar adjoining surfaces 1d and 2d over a relatively wide region to ensure a reliable attachment of the actuator, which in turn requires a machining operation over a relatively wide planar surface. In addition, in this type of arrangement, the mounting angle of the actuator relative to the transfer case is not easily adjustable, and an interchange of the components is difficult.

SUMMARY OF THE INVENTION

It is an object of the present invention to provide a transfer unit in an automobile which does not utilize a planar adjoining machined surface for attaching an actuator to a transfer case or an exposed rod which requires a rust prevention treatment.

According to the present invention, there is provided a transfer unit in an automobile for selectively transferring the drive power to wheels from a two wheel drive state to a four wheel drive state, and vice versa, comprising: a transfer case including a cylindrical wall portion, the transfer case having means arranged therein to effect the transfers between the two wheel drive and the four wheel drive states and a shaft means extending through the cylindrical wall portion and having one end connected to the means for effecting the transfer and the other end projecting outwardly from the cylindrical wall portion; a vacuum-operated actuator having a body including a cylindrical wall portion adapted to fit in overlapping engagement with the cylindrical wall portion of the transfer case, with a seal ring arranged between the cylindrical wall portions, a diaphragm mounted in the body, a rod having one end connected to the diaphragm for reciprocating movement therewith, and a means for interconnecting the other end of the actuator rod and the other end of the transfer shaft; means for a fastening the actuator body to the transfer case; and, means for supplying a vacuum to move the diaphragm.

BRIEF DESCRIPTION OF THE DRAWINGS

The other features and advantages of the present invention will be understood from the description of the preferred embodiment in reference to the attached drawings, in which.

DESCRIPTION OF THE PREFERRED EMBODIMENT

Figure 1:
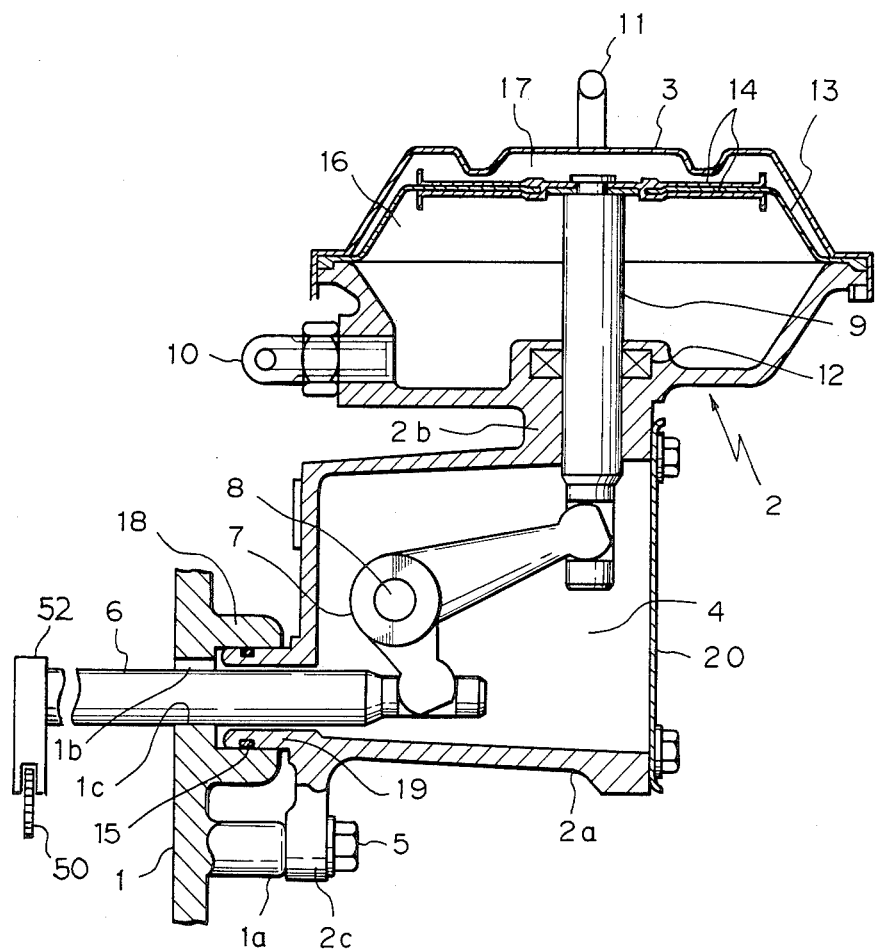
FIG. 1 is a view in section illustrating a portion of a transfer case and an actuator secured to the transfer case according to the present invention.
Figure 2:
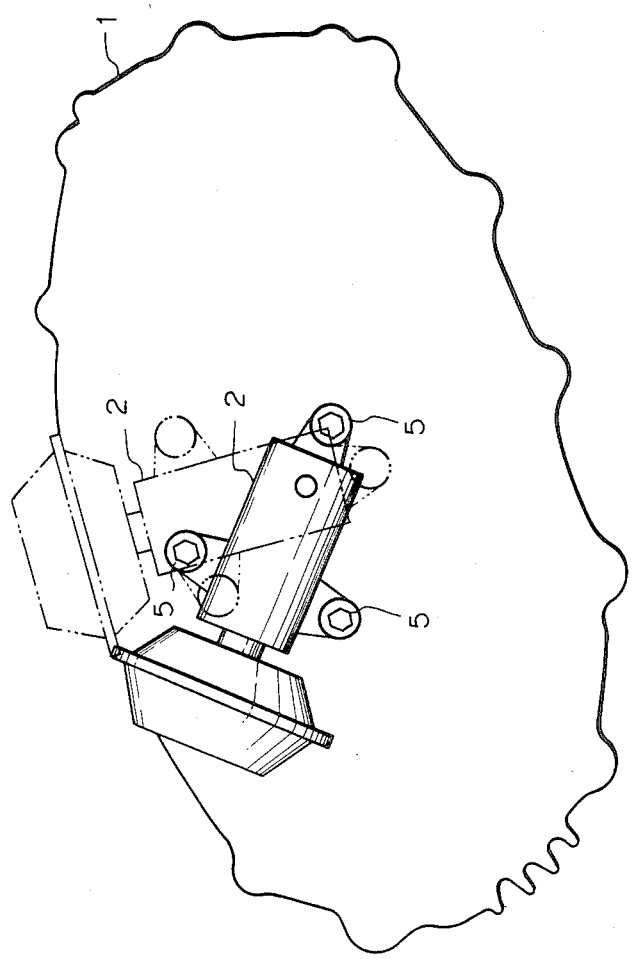
FIG. 2 is a view in front elevation of the actuator secured to the transfer case.
Figure 3:
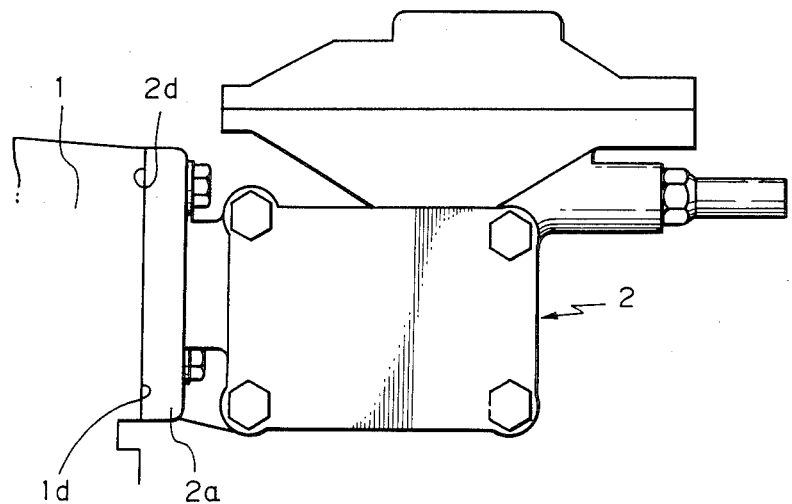
FIG. 3 is a view of the transfer case and an actuator of a prior art arrangement.

Referring to FIGS. 1 and 2, although the transfer case 1 is only partly shown, it will be understood by a person having ordinary skill in the art that the transfer unit selectively transfers the drive power from the internal combustion engine to the wheels, from a two wheel drive state to a four wheel drive state, and vice versa, and thus the transfer case 1 has means arranged therein to effect the transfer between the two wheel drive and four wheel drive states, typically in the form of a gear 50 and a fork 52 to move the gear. This gear can be carried on a splined output shaft leading to front wheels and can be selectively engaged with an input gear. In FIG. 1, a part of a transfer shaft 6 is shown. It will be clear that one end of the transfer shaft 6 carries the fork (not shown) to effect the transfer.

The transfer case 1 includes an outwardly projecting cylindrical wall portion 18. The transfer shaft 6 is inserted in and extends through the cylindrical wall portion 18, and the outer end of the transfer shaft 6 projects outwardly from the cylindrical wall portion 18. The cylindrical wall portion 18 and the transfer shaft 6 extend generally horizontally.

A vacuum-operated actuator 2 comprises a body 2a which includes, at the bottom thereof, an outwardly projecting cylindrical wall portion 19, which is fitted in the cylindrical wall portion 18 of the transfer case 1. A seal ring 15 is provided on the fitting surface between cylindrical wall portions 18 and 19. It will be clear that lubricant oil is filled in the transfer case 1. This oil can flow into the actuator body 2a through a clearance between the cylindrical wall portion 18 and the transfer shaft 6. Preferably, a slot 1b is provided on a hole 1c of the cylindrical wall portion 18 to aid the admission of the oil into the actuator body 2a.

The actuator body 2a includes a vertically oriented guide wall 2b forming a neck portion. A rod 9 extends through and is slidably guided by the guide wall 2b. A seal ring 12 is provided around the rod 9. The guide wall 2b separates the actuator body 2a into a lower chamber 4 and an upper chamber 16. A pin 8 is horizontally provided in the lower chamber 4, on which a bell-crank type double arm lever 7 is pivotally secured. As can be seen, one arm of the lever 7 engages with the outer end of the transfer shaft 6 in the lower chamber 4 and the other arm of the lever 7 engages with the lower end of the actuator rod 9. These elements can be lubricated by lubricant oil admitted in the lower chamber 4 as above described. A cover 20 is attached to the body 2a to close the lower chamber 4. The cover 20 can be detached for servicing.

The upper chamber 16 is sealed from the oil by the seal ring 12. The upper chamber 16 is formed by an upwardly opening wall of the actuator body 2 and a diaphragm 13 which is covered and fastened by a cover 3 to form a further chamber 17. The upper chamber 16 constitutes a first diaphragm chamber which has an inlet port 10 for admission of the operating vacuum. The further chamber 17 constitutes a second diaphragm chamber which also has an inlet port 11 for admission of the operating vacuum. These inlet ports 10 and 11 are connected to a vacuum source, such as an intake manifold of the engine, through a suitable solenoid valve means which can be controlled by the driver to effect the transfer. If the vacuum is admitted into the first diaphragm chamber 16, the diaphragm 13 moves downward, and if the vacuum is admitted into the second diaphragm chamber 17, the diaphragm 13 moves upward. The upper end of the rod 9 is fixed to the diaphragm 13 by plates 14. Thus the admitted vacuum moves the diaphragm 13, which moves the transfer shaft 6 through the lever 7 to effect the transfer.

The actuator body 2a further includes an extension wall 2c which extends perpendicularly to the cylindrical portion 19. In register with the extension wall 2c, a wall 1a projects from the transfer case 1 toward the actuator body 2a. A fastening means such as a bolt 5 fastens the body 2a to the transfer case 1. Referring to FIG. 2 a plurality of bolts 5 can be seen. These bolts 5 can be located without restriction because a sealing problem will not arise at the position of the bolt. At least one seal ring 15 can sufficiently seal the adjoining area between the transfer case 1 and the actuator body 2a. The actuator body 2a can be located at various angular positions relative to the transfer case 1 while the bolts 5 are not inserted, and FIG. 2 shows the actuator 2 in two positions, indicated by a solid line and a dot-dash line. This is advantageous when the design of the transfer case 1 is changed, and accordingly, the angle of the actuator 2 must be changed. In such a case, the actuator 2 can be used without changing the design thereof. Thus the applicability of the actuator 2 is broad, since it can be used for many types of the transfer case 1 at different angular positions. It will be clear that the cylindrical portions 18 and 19 need only be large enough to hold the transfer shaft 6, since the load is supported by the bolt 5. This is advantageous in that the cylindrical portions can be machined more easily than the planar wide adjoining surfaces in the prior art arrangement.

We claim:

1. A transfer unit in an automobile for selectively transferring the drive power to wheels from a two wheel drive state to a four wheel drive state, and vice versa, comprising:
   a transfer case including a cylindrical wall portion, said transfer case having means arranged therein to effect the transfer between the two wheel drive and the four wheel drive states and a shaft means extending through said cylindrical wall portion and having one end connected to said means to effect the transfer, the other end of said shaft means projecting outwardly from said cylindrical wall portion;
   a vacuum-operated actuator having a body including a cylindrical wall portion adapted to fit in overlapping engagement with said cylindrical wall portion of said transfer case so as to define an annular space between said shaft means and an innermost one of said cylindrical wall portions, with a seal ring arranged between the cylindrical wall portions, a diaphragm mounted in said body, an actuator rod having one end connected to said diaphragm for reciprocating movement therewith, and a means for interconnecting the other end of said actuator rod and said other end of said shaft means;
   means separate from said cylindrical wall portions for fastening said actuator body to said transfer case; and,
   means for supplying a vacuum to move said diaphragm.

2. A transfer unit according to claim 1, wherein the cylindrical wall portions include means for supplying a lubricant oil from the transfer case to the actuator body.

3. A transfer unit according to claim 2, wherein said actuator rod extends generally vertically and said means for interconnecting the other end of said actuator rod and said other end of said transfer shaft comprises a bell-crank type double arm lever movable about a horizontal axis.

4. A transfer unit according to claim 3, wherein a guide wall is provided for vertically guiding said actuator rod, said guide wall separating said body into a lower chamber in which said lever is located with the lubricant oil and an upper chamber in which said diaphragm is located.

5. A transfer unit according to claim 4 wherein a detachable cover is mounted on the body to cover the lower chamber.

6. A transfer unit according to claim 1, wherein said fastening means is a bolt.

7. A transfer unit according to claim 1, wherein said means of effecting the transfer comprises a fork carried by said transfer shaft and a gear engaged by said fork.

8. A transfer unit according to claim 1, wherein said cylindrical wall portion extends outwardly of said transfer case.

9. A transfer unit in an automobile for selectively transferring the drive power to wheels from a two wheel drive state to a four wheel drive state, and vice versa, comprising:
   a transfer case including a cylindrical wall portion, said transfer case having means arranged therein to effect the transfer between the two wheel drive and the four wheel drive states and a shaft means extending through said cylindrical wall portion and having one end connected to said means to effect the transfer, the other end of said shaft projecting outwardly from said cylindrical wall portion;
   a vacuum-operated actuator having a body including a cylindrical wall portion adapted to fit in or over said cylindrical wall portion of said transfer case with a seal ring arranged between the cylindrical wall portions, a diaphragm mounted in said body, a rod having one end connected to said diaphragm for reciprocating movement therewith, and a means for interconnecting the other end of said actuator rod and said other end of said transfer shaft;
   means for fastening said actuator body to said transfer case; and,
   means for supplying a vacuum to move said diaphragm,
   wherein the cylindrical wall portions include means for supplying a lubricant oil from the transfer case to the actuator body and wherein said means for interconnecting comprises a bell-crank type double arm lever.

10. A transfer unit according to claim 9, wherein said actuator rod extends generally vertically and said bell crank type double arm lever is pivotable about a horizontal axis.

11. A transfer unit according to claim 10, wherein a guide wall is provided for vertically guiding said actuator rod, said guide wall separating said body into a lower chamber in which said lever is located with the lubricant oil and an upper chamber in which said diaphragm is located.

12. A transfer unit according to claim 11 wherein a detachable cover is mounted on the body to cover the lower chamber.

* * * * *